United States Patent

[11] 3,596,864

[72] Inventor Roger C. Stephens
 Hamburg, N.Y.
[21] Appl. No. 815,393
[22] Filed Apr. 11, 1969
[45] Patented Aug. 3, 1971
[73] Assignee Ferro Frontiers, Inc.
 Buffalo, N.Y.

[54] CLIP FOR ANCHOR BRICK
 3 Claims, 7 Drawing Figs.
[52] U.S. Cl. ................................................. 248/317,
 52/484, 110/99 R
[51] Int. Cl. ................................................. F23m 5/02
[50] Field of Search.......................................... 248/317,
 226, 226.2, 228, 229; 110/99 R, 99 A; 52/484

[56] References Cited
UNITED STATES PATENTS
| 417,957 | 12/1889 | Trabert | 248/228 X |
| 984,761 | 2/1911 | Green | 294/104 X |
| 1,412,201 | 4/1922 | Westerhaus | 294/104 |
| 2,457,646 | 12/1948 | Dalferes | 294/104 |

FOREIGN PATENTS
| 59,893 | 1/1968 | Germany | 110/99 |
| 313,175 | 6/1930 | Great Britain | 110/99 |

Primary Examiner—J. Franklin Foss
Attorney—Webb, Burden, Robinson & Webb

ABSTRACT: A clip for securing anchor brick to a flanged beam comprising two arms joined by a pivot member. The arms are shaped to rotate into snug envelopment of the flange on the beam and thereafter to permit the sliding engagement of the anchor brick locking the clip on the beam.

Patented Aug. 3, 1971

INVENTOR.
Roger C. Stephens
BY
Webb, Burden, Robinson & Webb

HIS ATTORNEYS

Patented Aug. 3, 1971　　　3,596,864

INVENTOR.
Roger C. Stephens
BY
Webb, Burden, Robinson & Webb
HIS ATTORNEYS 3,596,864

1

CLIP FOR ANCHOR BRICK

BACKGROUND

Refractory linings in furnaces, such as soaking pits for steel ingots, are often supported by a superstructure of steel beams. The linings may be brick or monolithic, for example rammed or case, but they are usually secured to the superstructure by anchor brick and clips. The anchor brick are positioned within the lining surrounded with either other refractory brick or monolithic refractory. The clips secure the anchor brick to the steel beams.

It is almost always a requirement that there be little or no play or slack between the beam and the anchor brick. One type of clip very often used in initial construction of furnaces is designed to slide snugly over the flange from an end of the beam. Obviously, this clip must be engaged with the beam before the ends of the beam are attached to other transverse beams. Hence, these clips can only be removed from or added to existing superstructures by cutting the flange. This drastically reduces the strength of the beam and is clearly undesirable. Other clips are designed to engage the steel beam without first cutting the flange, but these clips must be wedged into a load bearing position to avoid slack between the beam and the anchor brick. Wedging is very time consuming and therefore undesirable. Prior to wedging and even often thereafter these clips can be jarred off the beam. They are wedged either toward or away from the beam depending upon whether the anchor brick they secure will be in tension or compression. This type clip is inadequate especially where the loading of the anchor brick will reverse during the life of the furnace.

According to this invention, there is provided a clip for securing anchor brick to steel beams which does not require that the flange on the beam must be cut prior to installation. No wedges are required to force the clip into load bearing position allowing the refractory anchor to be used effectively in either compression or tension. Once the clip is placed on the beam and the refractory anchor is inserted, it is not possible for the clip to be jarred loose.

THE INVENTION

Basically according to this invention, the clip is comprised of two arms which are pivotally joined. The arms are shaped on one side of the joining means so that they can be rotated to snugly envelop a flange on a beam. The arms on the other side are shaped so after the clip has been rotated upon the beam a refractory anchor brick can be slid into engagement with the clip locking the clip upon the beam.

Further features and other objects and advantages of clips according to this invention will be apparent from the following detailed description made with reference to the drawings in which.

Figure 1:
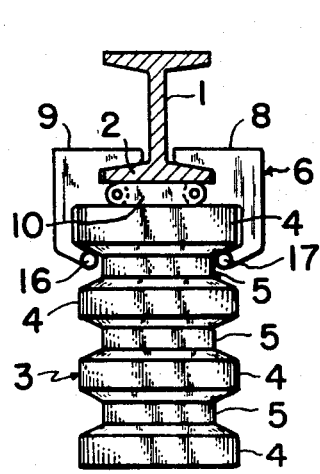
FIG. 1 is a front view showing a clip securing an anchor brick to an I-beam and FIG. 1A is a side view of same.
Figure 1A:
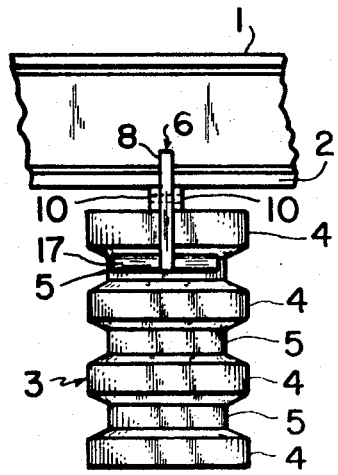

Referring now to FIG. 1, a beam 1 is shown having a flange section 2. An I-beam is shown in the drawing, however, an inverted T-beam or even, for example, a channel beam may be engaged with suitable clips according to this invention. Elongate anchor brick 3 of the type used for anchoring monolithic linings is shown with raised 4 and depressed 5 portions perpendicular to the long axis of the brick, the uppermost depression is a slot which enables engagement of the brick with the clip 6.

2

Figure 2:
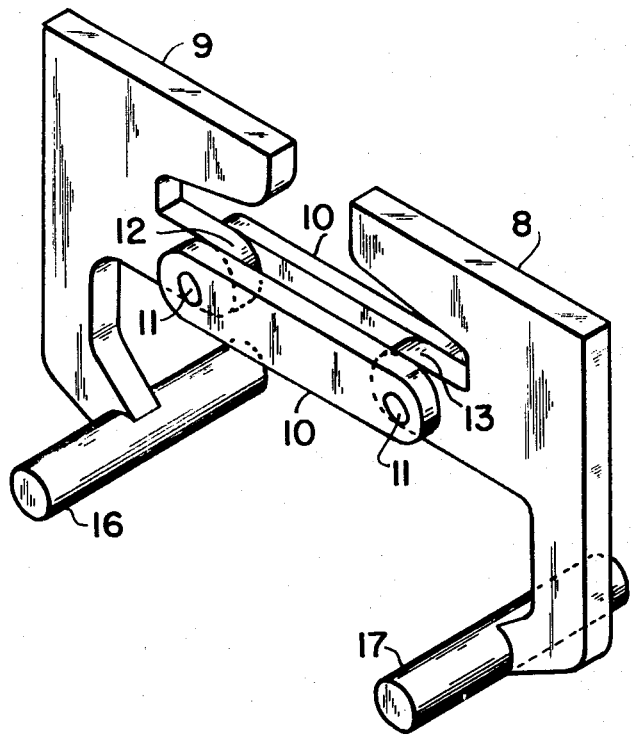
FIG. 2 is a pictorial view of a preferred embodiment according to this invention.

Referring now to FIG. 2, the clip may have a right arm 8 and a left arm 9 and joining members 10. The joining members are pivotally secured to fingers 12 and 13 extending from the arms toward each other. In the drawing, the joining members are shown as two elongate strips 10 having apertures near each end thereof. An aperture is provided in the fingers enabling a rivet 11 or some other fastener to pivotally secure the arms and the joining members. The arms are shaped to be rotated into snug envelopment of the flange of an I-beam, T-beam or any other flanged beam. Bearing elements 16 and 17 are secured to the end of the arms extending away from the beam and perpendicular thereto. The arms are shaped and the bearing members positioned so that when the clip is rotated about the flange a refractory anchor brick can be slid into engagement with the clip. The bearing members 16 and 17 provide a large surface for distributing load to the refractory brick. This is often essential because of the brittle nature of refractory brick. As the temperature of the clips during operation of the furnace may exceed, for example 500° F., it is necessary that they be manufactured from a suitable high temperature metal. Usually stainless steel is satisfactory.

Figure 3:
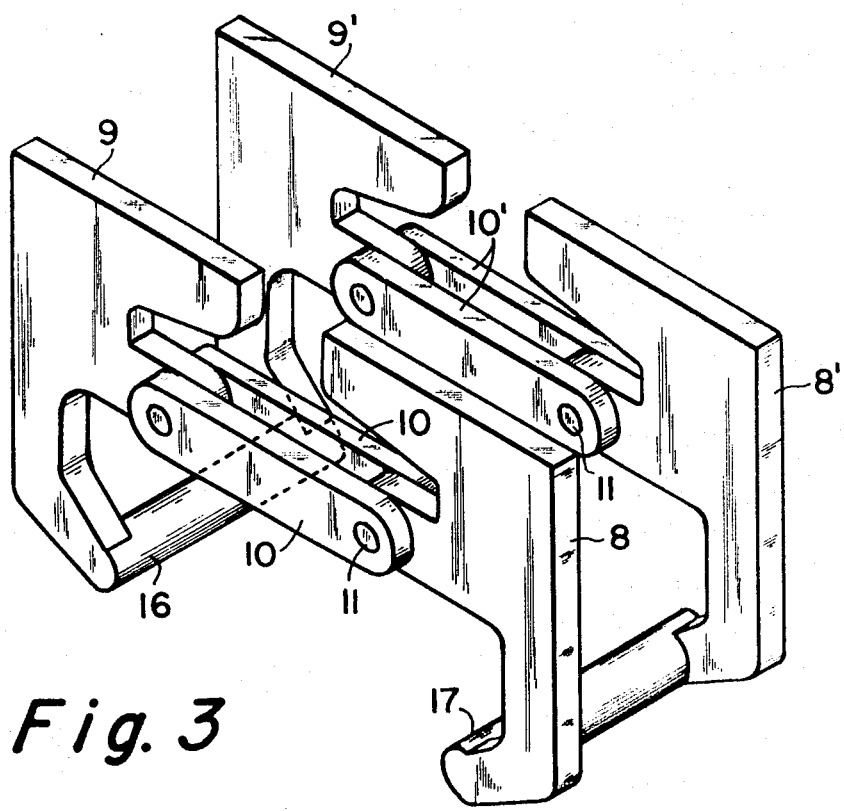
FIG. 3 is a pictorial view of another embodiment according to this invention.

Referring now to FIG. 3, clips according to this invention may be comprised of multiple arms 8 and 8' on one side and multiple arms 9 and 9' on the other. The bearing members 16 and 17 join each arm. Joining members 10, 10' are provided between each set of arms. The clips illustrated in FIGS. 2 and 3 are according to a preferred mode of practicing this invention wherein the upper edges of the joining members are elongate and contact the lower edge of the flange after the clip has been rotated upon the beam.

However, it is not necessary that the joining members be elongate or that their upper edge contact the lower edge of the flange.

Figure 4:
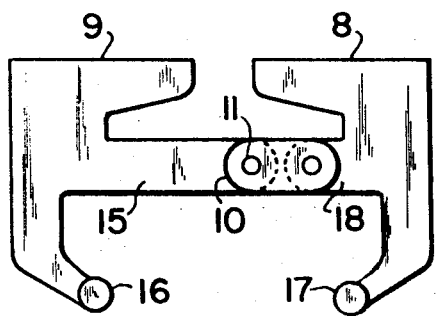
FIG. 4 is a front view of yet another embodiment of this invention.

Referring now to FIG. 4, the flange may be joined to fingers 15 and 18 extending from the arms 8 and 9. A short joining member 10 is pivotally secured to both fingers. In this instance, it is preferable for one of the fingers to be substantially longer than the other as shown in the drawing.

Figure 5:
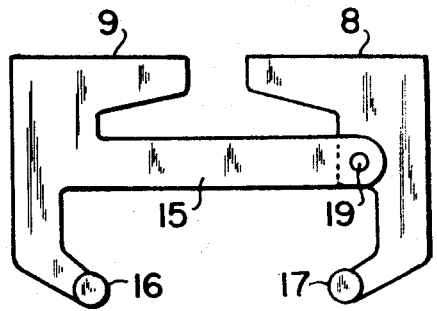
FIG. 5 is a front view of still another embodiment of this invention.

In yet another mode of practicing this invention, it is not even necessary that the joining member be a distinct element. Referring to FIG. 5, one arm 9 has a long finger 15 which is pivotally secured at 19 to the opposite arm 8. The pivot is at a point on the right arm 8, for example, which enables that arm to be rotated onto the flange after the left arm 9 has already been worked onto the flange.

The clips are installed simply by first rotating the bearing members toward each other opening the clip so that it can be placed about the flange of the beam.

Figure 6:
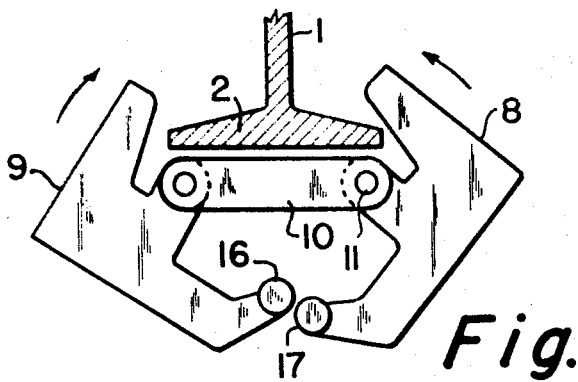
FIG. 6 is a front view illustrating the manner in which clips according to this invention are rotated into engagement about the flange of a beam.

FIG. 6 shows a clip according to this invention in the broken position just before being rotated into engagement with the flange of a beam. Thereafter, the clip is rotated to snugly envelop the flange. A refractory anchor brick is then slidably engaged with the clip. The bearing elements enter the groove provided therefor near the top of the refractory anchor brick. After the brick is in place, the clip is locked upon the flange. No wedging is required to secure the clip in its load bearing position whether the anchor brick will be in tension or in compression.

Having thus described my invention with the particularity required by the patent law, what is desired to have protected by Letters Patent is as follows.

I claim:

1. A clip for securing anchor brick having slots near one end on opposite faces to a beam having a flanged section comprising at least one right arm and at least one left arm facing said right arm, means for joining the arms together comprising a cross member pivotally attached at one end to one arm and pivotally attached at the other end to the other arm, elongate bearing members secured to the arms and perpendicular thereto, the edges of the arms and the adjacent top edge of the joining means shaped to rotate into snug envelopment of the flange of the beam, such that the top of the joining means abuts the undersurface of the flanged section, the opposite side of the joining member and adjacent edges of the arms and elongate bearing members shaped to just permit sliding engagement with the end of the brick after the clip is rotated about the beam flange thereby locking the clip upon the flange.

2. A clip for securing an anchor brick having slots near one end on opposite faces to a beam having a flanged section comprising a plurality of right arms and a plurality of left arms facing said right arms, a plurality of means comprising a member pivotally attached at one end to a right arm and pivotally attached at the other end to a left arm for joining the arms together, the edges of the joining means and the adjacent edges of the arms shaped to be rotated into snug envelopment of the flange of the beam, the opposite side of the said joining means and the adjacent edges of the arms shaped to just permit sliding engagement with the end of the brick when it is rotated about the beam flange thereby locking the clip upon the beam flange.

3. A clip according to claim 2 having one elongate bearing member secured to the right arms perpendicular thereto and another elongate member secured to the left arms and perpendicular thereto, said bearing members arranged to engage the slots in the anchor brick.